United States Patent [19]

Tomii et al.

[11] Patent Number: 5,324,235

[45] Date of Patent: Jun. 28, 1994

[54] CARDAN-TYPE UNIVERSAL JOINT

[75] Inventors: Hiroyasu Tomii; Yukio Kaneko, both of Nogi, Japan

[73] Assignee: Nippon Piston Ring Co., Ltd., Tokyo, Japan

[21] Appl. No.: 926,295

[22] Filed: Aug. 10, 1992

[30] Foreign Application Priority Data

Aug. 21, 1991 [JP] Japan .................. 3-209093

[51] Int. Cl.⁵ ................................. F16D 3/12
[52] U.S. Cl. ........................ 464/136; 464/78; 464/182; 403/58
[58] Field of Search ............... 464/78, 79, 105, 134, 464/135, 136, 160, 161, 182, 185; 403/57, 58

[56] References Cited

U.S. PATENT DOCUMENTS

| | | | |
|---|---|---|---|
| 3,543,599 | 12/1970 | Caswell | 464/78 X |
| 4,472,713 | 9/1984 | Breslow | 464/182 X |
| 4,690,661 | 9/1987 | Fredericks et al. | 464/78 |
| 4,983,143 | 1/1991 | Sekine et al. | 464/160 X |
| 5,062,730 | 11/1991 | Tomii et al. | 464/137 X |
| 5,186,229 | 2/1993 | Hsu | 403/58 X |

FOREIGN PATENT DOCUMENTS

| | | | |
|---|---|---|---|
| 2433282 | 2/1975 | Fed. Rep. of Germany | 464/78 |
| 2435450 | 2/1976 | Fed. Rep. of Germany | 464/78 |
| 3-74632 | 3/1991 | Japan . | |

Primary Examiner—Clifford D. Crowder
Assistant Examiner—John J. Calvert

[57] ABSTRACT

A Cardan-type universal joint has a pair of joint bodies (11) each having a cylindrical hub (12) for securing thereto a rotary shaft (10), and a cross-shaped member (15) for connecting the pair of joint bodies together. Each of the hubs has at least one first slit, or escape slit, (20) formed therein radially inwardly from the circumference thereof having a sector shape with a sectoral angle of not less than 180 degrees and being disposed on a plane intersecting the axis of the shaft at an angle, thereby enabling the joint body to elastically deform in a spring-like manner.

10 Claims, 2 Drawing Sheets

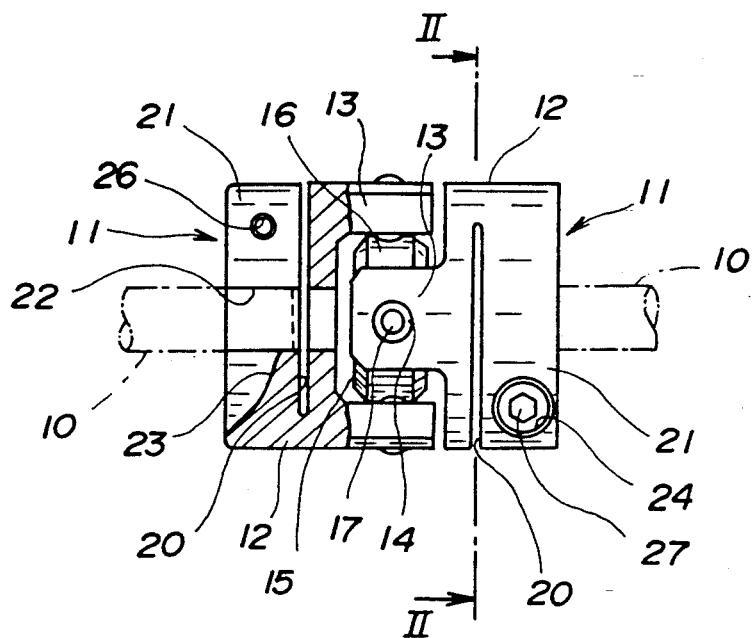
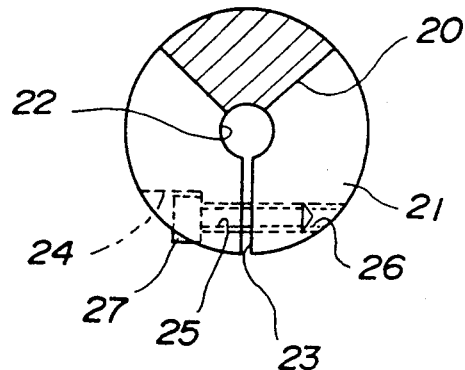
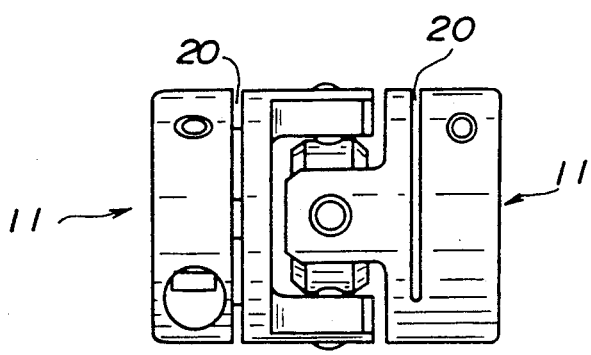
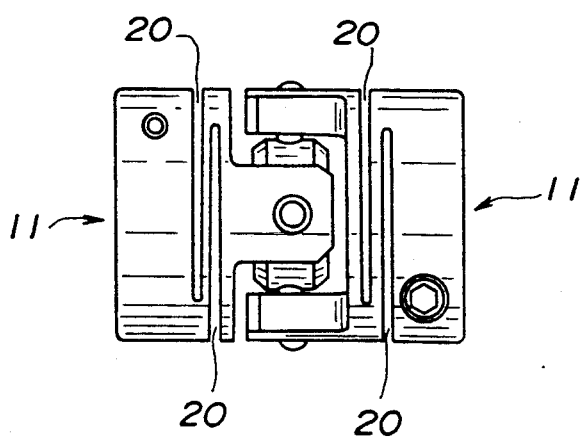

CARDAN-TYPE UNIVERSAL JOINT

BACKGROUND OF THE INVENTION

1. Field of the Invention

The present invention relates to improvements in a Cardan-type universal joint.

2. Description of the Prior Art

A prior Cardan-type non-constant angular velocity universal joint is publicly known through such information as disclosed in Japanese Patent Unexamined Publication No. (JP-A) HEI-3-74632.

The universal joint publicly known as above has a pair of joint bodies each comprising a cylindrical hub to be secured to a rotary shaft, and two yokes protruding in the axial direction from one end of the hub at two circumferential positions mutually oppositely disposed in a radial direction of the hub toward the other joint body. The hub and the yokes of each of the joint bodies are formed together into a single component part.

The universal joint publicly known as above also has a cross-shaped member comprising four pins protruding radially therefrom in a cross-shaped manner such that the pair of joint bodies are connected with each other at a phase difference angle of 90 degrees by having each of the pins supported with bearing means at a corresponding one of the yokes of the pair of joint bodies. The bearing means has a bearing hole disposed radially at and through the front end portion of each of the yokes, the bearing hole having an oilless-metal sleeve pressure-fitted and secured therein. The cross-shaped member further comprises a short column-shaped center piece having four circumferentially spaced pin holes formed radially therein, the center piece having the pins respectively slidably and rotatably inserted through the sleeves of the yokes and pressure-fitted in the pin holes such that the pair of joint bodies are coupled together through the cross-shaped member so as to constitute the universal joint.

Although the prior Cardan-type universal joint publicly known as above is capable of absorbing angular deflection and eccentricity between two rotary shafts secured to the joint, the prior joint has a disadvantage in that it is not suitable for coupling rotary shafts that are displaced axially by axial load since the prior joint does not have escape means between the hub and the rotary shaft against such axial displacement. The present invention is made to solve such a problem.

SUMMARY OF THE INVENTION

It is therefore an object of the present invention to provide a Cardan-type non-constant angular velocity universal joint that is also applicable to rotary shafts that are displaced axially by axial load.

In order to solve the problem described above, according to one embodiment of the present invention, there is provided a Cardan-type universal joint having at least one first slit, or axial-displacement escape slit (escape slit) formed on each of the hubs radially inwardly from the circumference of the hubs such that the first slit is a sector-shaped slit that lies on a plane intersecting the axis of the rotary shaft at an angle. The sector-shaped first slit may advantageously have a sectoral angle of not less than 180 degrees. The at least one first slit formed on each of the hubs may be a plurality of first slits, and in that case, the first slits may be advantageously disposed to be parallel with each other and alternately extending radially inwardly from either one or two circumferential positions of each of the hubs opposed with each other in a radial direction of the hub. In one aspect of the present invention, an arrangement is taken with respect to the directions of the first slits in the pair of joint bodies, in which the at least one first slit on one joint body of the pair of joint bodies is arranged to have a phase difference angle of substantially 180 degrees from the at least one first slit on the other of the pair of joint bodies by having the first slit of the one joint body formed such that the phase of the first slit thereof is shifted by 90 degrees from the phase of the first slit of the other joint body of the same pair of joint bodies. In another aspect of the present invention, the hub and the yokes of a same joint body is formed together into one single component part, instead of the hub and the yokes being manufactured as separate components. In still another aspect of the present invention, a shaft-securing portion is constituted on the hub outside the first slits, and a second slit, or a shaft-securing slit, extending radially inwardly is formed into the shaft-securing portion such that the shaft-securing portion split by the second slit is fastened together by fastening means, thereby securing the rotary shaft thereto with clamping action.

Thus, in the Cardan-type universal joint of the present invention, since the hub of the joint body has at least one first slit formed therein radially inwardly as described above, the hub is capable of elastically deforming substantially in the axial direction. Subsequently, axial displacement of a rotary shaft caused by axial load can be absorbed by axial elastic deformation of the hub.

Therefore, the Cardan-type universal joint of the present invention has an advantage in that such universal joint is applicable to rotary shafts for use under axial load because of capability for absorbing axial displacement of the rotary shaft as described above, in contrast to prior art universal joint which was not applicable to such rotary shafts for use under axial load because of incapability for absorbing axial displacement. In addition, the Cardan-type universal joint of the present invention has an advantage in that tolerance for angular deflection and eccentricity of the universal joint can be expanded in comparison with a prior art universal joint that has no escape slits, since angular deflection and eccentricity between the rotary shafts on both sides can be absorbed by the elastic deformation of the hub to certain extent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, in which:

FIG. 1 is an elevational view of a first embodiment of the Cardan-type universal joint in accordance with the present invention;

FIG. 2 is a cross sectional view of the joint of FIG. 1, taken along the line II—II of FIG. 1;

FIG. 4 is a view corresponding to FIG. 1, of a second embodiment of the present invention; and FIG. 5 is a view corresponding to FIG. 1, of a third embodiment of the present invention.

DESCRIPTION OF THE PREFERRED EMBODIMENTS

Figure 3:
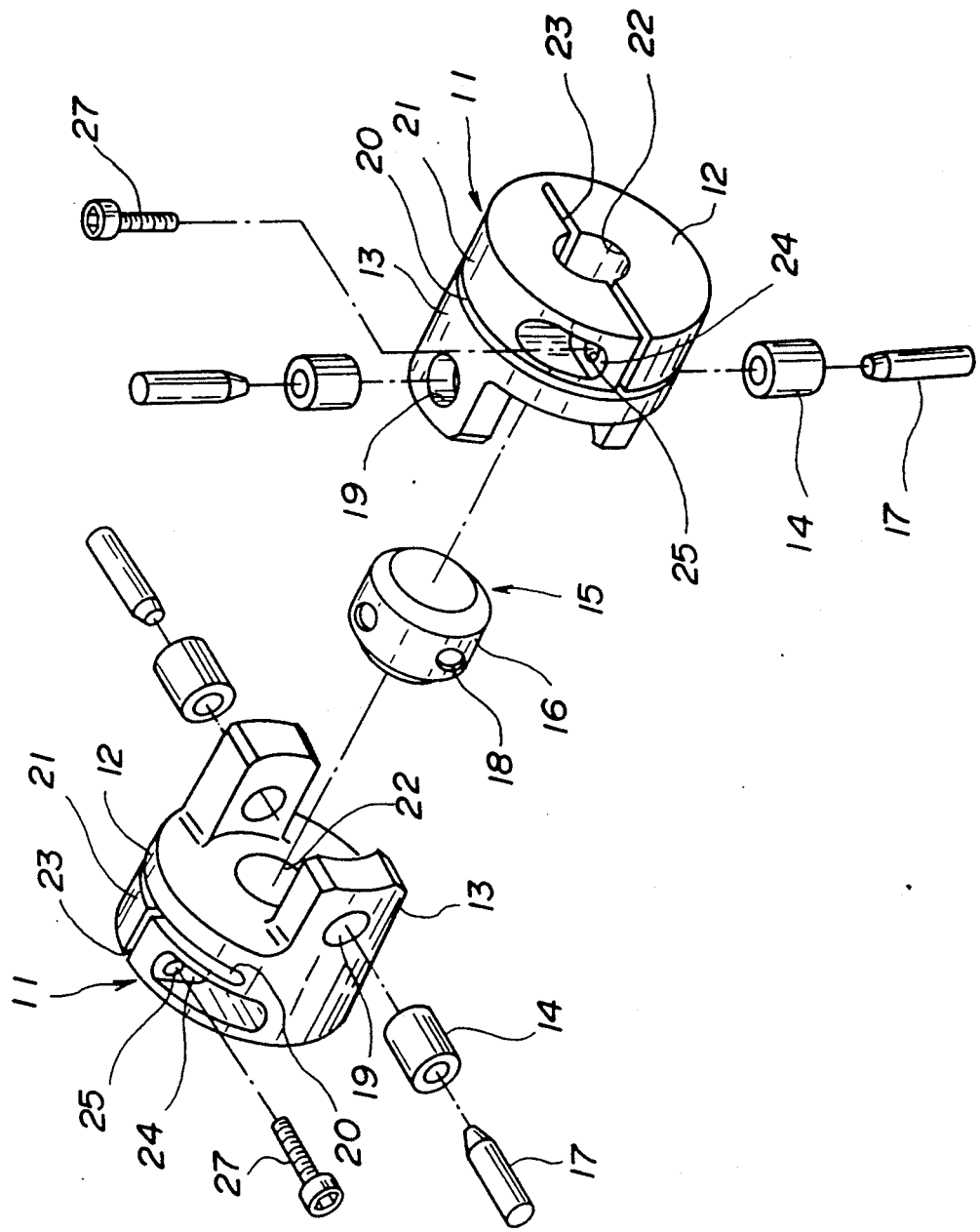
FIG. 3 is a perspectively seen exploded view of the joint of FIG. 1.

The present invention will be described, in detail, according to embodiments referring to the accompanying drawings.

As shown in FIGS. 1 to 3, a Cardan-type universal joint, according to the present invention, has a pair of joint bodies 11 each comprising: a cylindrical hub 12 that is adapted to secure thereto either of two rotary shafts 10 on both sides and has a shaft hole 22 formed therein so as to have said shaft 10 inserted therein; and two yokes 13 that protrude in the axial direction from one end of the hub 12 at two circumferential positions mutually oppositely disposed in a radial direction of the hub 12 toward the other joint body 11. The hub 12 and the yokes may be fabricated as separate components. In this first embodiment as an aspect of the present invention, however, the hub 12 and the yokes 13 of the same joint body may be advantageously formed together into one single body by utilizing a manufacturing method including, but not limited to, sintering, diecasting and forging, thereby reducing number of components for the joint body 11.

The Cardan-type universal joint, according to the present invention, also has a cross-shaped member 15 comprising four pins 17 protruding radially therefrom in a cross-shaped manner. When assembling the universal joint, the pair of joint bodies 11 are connected with each other via the cross-shaped member 15 by having each of the pins 17 supported with bearing means at a corresponding one of the yokes 13 of the pair of joint bodies 11. In the present embodiment, the bearing means has a bearing hole 19 disposed radially at and through the front end portion of each of the yokes 13, and the bearing hole 19 has an oilless metal sleeve 14, as a bearing-metal sleeve, pressure-fitted therein.

Also in the present embodiment, the cross-shaped member 15 further comprises a column-shaped center piece 16 having four pin holes 18 formed radially inwardly from the circumference thereof circumferentially equally spaced with each other in a cross-shaped manner such that the center piece 16 has the pins 17 respectively inserted through the sleeves 14 and pressure-fitted in the pin holes 18.

The universal joint, according to the present invention, is arranged such that each of the hubs 12 has at least one first slit 20, or axial-displacement escape slit, formed therein radially inwardly from the circumference of the hub 12 for absorbing axial-displacement of the rotary shaft caused by axial load, where the first slit 20 has a sector shape with a sectoral angle of not less than 180 degrees, particularly 270 degrees in the present embodiment, and is disposed so as to be on a plane intersecting the axis of the rotary shaft at an angle of 90° or less in the axial direction, particularly at a right angle in the present embodiment.

In an aspect of the present invention, the universal joint has a shaft-securing portion 21 constituted on the hub 12 axially outwardly adjacent to the at least one first slit 20 toward the other end of the hub 12. The shaft-securing portion 21 has a second slit 23, or a shaft-securing slit, formed therein such that the second slit 23 extends axially along the shaft-securing portion 21 lengthwise and extends radially inwardly from the circumference of the shaft-securing portion 21 to a depth deeper than the shaft hole 22 depthwise so as to axially split the shaft-securing portion 21 into two half-portions up to the depth of the second slit. One half-portion of the shaft-securing portion 21 has a bolt head seat 24 and a bolt through hole 25 formed therein, and the other half-portion of the shaft-securing portion has a bolt thread hole 26 formed therein in line with the bolt through hole 25 such that the bolt through hole 25 and the bolt thread hole 26 are disposed at a position closer to the opening of the second slit 23 than the shaft hole 22. Thus, when securing the rotary shaft 10 to the hub 12, a fastening means, particularly a bolt 27 in the present embodiment, is screwed into the bolt thread hole 26 through the bolt through hole 25, thereby a gap between the two half-portions of the shaft-securing portion 21 of the hub 12, and in turn gap between the shaft hole 22 and the rotary shaft 10, being squeezed so as to secure, by clamping, the rotary shaft 10 to the shaft-securing portion 21, and in turn to the hub 12.

This shaft-securing-by-clamping arrangement, according to the present invention, has an advantage in that this arrangement can eliminate, in the course of securing the shaft 10, the necessity for either forming a keyway on the shaft 10, which may cause cost and time, or setting a setscrew against the circumference of the shaft 10, which is likely to cause damage to the shaft. It is noted, however, that the present invention is not limited to implementations with the shaft-securing-by-clamping arrangement described above, but also applicable to implementations with shaft-securing arrangements other than by clamping, such as key-keyway arrangements or setscrew arrangements, without departing from the spirit and scope of the present invention.

As described above, the universal joint, according to the present invention, is arranged to have each of the two hubs 12 with at least one, sector-shaped, first slit 20, or axial-displacement escape slit, formed therein such that the first slit provides axial spring effects, and thus capability for absorption of axial displacement of the shaft 10.

The phase relations, or phase difference, between the centerlines of the respective first slits 20 of one and the other of the pair of joint bodies 11, when assembled, may be of any angle.

As shown in FIGS. 1 to 3, in the universal joint according to the first embodiment, the phase difference angle between the first slits of the same pair of joint bodies is advantageously arranged to be 180 degrees such that a maximum axial spring effects on, or maximum capability for absorption of, axial displacement of the shaft 10, is obtained, though the phase difference of 180 degrees, when assembled, described above, causes the pair of joint bodies 11 to be not fully identical parts with each other, where their respective first slits, or escape slits, 20 of the pair of joint bodies 11, when disassembled, have a phase difference of 90 degrees with each other.

As shown in FIG. 4, a universal joint according to a second embodiment, with two mutually fully identical joint bodies 11, may be implemented, thereby bringing an advantage of reducing the number of kinds of component parts, though this arrangement causes a phase difference of 90 degrees between the respective escape slits 20 of the pair of joint bodies 11, when assembled, thereby causing a decrease in the axial spring effects of the escape slits 20 compared with the universal joint having a 180-degree phase difference between the escape slits, when assembled, according to the first embodiment of the present invention, as described above.

In an aspect of the present invention, as shown in FIG. 5, according to a third embodiment, a plurality of first slits, or escape slit, 20, instead of a single slit, may be formed on each of the pair of joint bodies 11 such that the first slits are disposed to be parallel with each other and alternately extending radially inwardly from either one of two circumferential positions mutually oppositely disposed in a radial direction of the hub. A universal joint, according to the present invention, having a larger number of the escape slits 20 on each joint body 11 has an advantage of obtaining greater axial spring effects of the escape slits 20 on axial displacement of the shaft 10, compared with a joint having a smaller number of escape slits 20.

Now, the process of absorbing axial displacement will be described with regard to the universal joint according to the present invention. The joint body 11 is capable of elastically deforming in the axial direction, since the hub 12 of the joint body 11 has at least one first slit, or escape slit, 20 formed therein, as described above. Therefore, even when a rotary shaft 10 connected to the joint body 11, is loaded with axial load, and thereby the shaft 10 is displaced axially, the axial displacement of the shaft 10 is absorbed by axial elastic deformation of the joint body 11, whereby it is not likely that uneven transmission of rotation is caused by axial displacement of the rotary shaft 10, or damage is caused in the universal joint itself.

In FIGS. 1 and 3, is assumed, for the sake of discussion, that the rotary shaft 10 on the left side is a driving shaft 10, which is connected to the joint body 11 on the left side comprising the hub 12 and the yokes 13, which is in turn a driving joint body 11. In turn, it is also assumed that the joint body 11 on the right is a driven joint body 11 comprising the yokes 13 and the hub 12, which is connected to the rotary shaft 11 on the right, which is in turn a driven shaft 10. The driving joint body 11 and the driven joint body 11 are connected together via the cross-shaped member 15.

In operation, rotation is transmitted from the driving shaft 10 via the hub 12, the yokes 13, the sleeves 14 and the pins 17 on the driving side, to the cross-shaped member 15. Then, the rotation is transmitted via the pins 17, the sleeves 14, the yokes 13 and the hub 12 on the driven side, to the driven shaft 10. Then, eccentric movement of one shaft 10 against the other shaft 10, if any, is absorbed by sliding movement between the pins 17 and the sleeves 14. Angular deflection of one shaft 10 against the other shaft 10, if any, is also absorbed by rocking motion between the pins 17 and the sleeves 14. Axial displacement of either shaft 10 due to axial loading is absorbed by the spring effects caused by the first slit(s), or escape slit(s), 20 formed in the hub(s) 12, as described above. In addition, the eccentricity and angular deflection between the shafts 10 are also absorbed by the spring effects caused by the first slit(s), or escape slit(s), 20 formed in the hub(s) 12, as described above.

Thus, the universal joint, according to the present invention, has advantages in that such joint is applicable to rotary shafts for use under axial load because of capability for absorbing axial displacement of the rotary shaft as described above, in contrast to prior art universal joint which was not applicable to such rotary shafts for use under axial load because of incapability for absorbing axial displacement. In addition, the Cardan-type universal joint of the present invention has an advantage in that tolerance for angular deflection and eccentricity of the universal joint can be expanded in comparison with a prior art universal joint that has no escape slits 20, since angular deflection and eccentricity between the rotary shafts on both sides can be absorbed by the elastic deformation of the hub to certain extent.

While there have been described certain particular embodiments of the present invention, it will be understood that various modifications may be made therein, and it is intended to cover in the appended claims all such modifications as fall within the true spirit and scope of the present invention. It will be also noted that the marks and symbols appearing in the appended claims are added only for the purpose of facilitating clear understanding of the present invention, and are not considered to limit the spirit and scope of the present invention.

What is claimed is:

1. A Cardan-type universal joint, comprising: a pair of joint bodies each comprising a cylindrical hub, said hub having a shaft hole formed therein so as to have a shaft inserted therein, and two yokes protruding in the axial direction from one end of said hub at two circumferential positions mutually oppositely disposed in a radial direction of said hub toward the other joint body; and a cross-shaped member comprising four pins protruding radially therefrom in a cross-shaped manner such that said pair of joint bodies are connected with each other via said cross-shaped member by having each of said pins supported with bearing means at a corresponding one of said yokes of said pair of joint bodies;

each of said hubs having at least one first slit formed therein radially inwardly from the circumference thereof, where said first slit has a sector shape with a sectoral angle of not less than 180 degrees, said first slit being disposed in a plane intersecting the axis of said rotary shaft at an angle of 90° or less with respect to the axial direction:

a shaft-securing portion on said hub axially outwardly adjacent to said at least one slit toward the other end of said hub, said shaft-securing portion having a second slit formed therein such that said second slit extends axially along said shaft-securing portion lengthwise and extends radially outwardly from the circumference of said shaft-securing portion to a depth deeper than said shaft hole depthwise so as to axially split said shaft-securing portion up to said depth, said shaft-securing portion having a fastening means disposed across said second slit such that said fastening means fastens said split shaft-securing portion together across said second split at a position closer to the opening of said second slit than said shaft hole for securing said shaft inserted into said shaft hole.

2. The Cardan-type universal joint according to claim 1, wherein the intersecting angle of said first slit is substantially a right angle.

3. The Cardan-type universal joint according to claim 2, wherein said at least one first slit formed on each of said hubs is a plurality of first slits disposed parallel with each other, said first slits alternately extending radially inwardly from either one of two circumferential positions of each of said hubs opposed with each other in a radial direction of the hub.

4. The Cardan-type universal joint according to claim 3, wherein said first slits on one of said pair of joint bodies are arranged to have a phase difference angle of substantially 180 degrees from said first slits on the other of said pair of joint bodies.

5. The Cardan-type universal joint according to claim 4, wherein:
said hub and said yokes of each of said joint bodies are formed together into a single member,
said bearing means has a bearing hole disposed radially at and through the front end portion of each of said yokes, said bearing hole having a bearing-metal sleeve pressure-fitted therein, and
said cross-shaped member further comprises a center piece having four circumferentially equally spaced pin holes formed radially therein, said center piece having said pins respectively inserted through said sleeves and pressure-fitted in said pin holes.

6. The Cardan-type universal joint according to claim 3, wherein:
said hub and said yokes of each of said joint bodies are formed together into a single member,
said bearing means has a bearing hole disposed radially at and through the front end portion of each of said yokes, said bearing hole having a bearing-metal sleeve pressure-fitted therein, and
said cross-shaped member further comprises a center piece having four circumferentially equally spaced pin holes formed radially therein, said center piece having said pins respectively inserted through said sleeves and pressure-fitted in said pin holes.

7. The Cardan-type universal joint according to claim 2, wherein said at least one first slit on one of said pair of joint bodies is arranged to have a phase difference angle of substantially 180 degrees with said at least one first slit on the other of said pair of joint bodies.

8. The Cardan-type universal joint according to claim 7, wherein:
said hub and said yokes of each of said joint bodies are formed together into a single member,
said bearing means has a bearing hole disposed radially at and through the front end portion of each yokes, said bearing hole having a bearing-metal sleeve pressure-fitted therein, and
said cross-shaped member further comprises a center piece having four circumferentially equally spaced pin holes formed radially therein, said center piece having said pins respectively inserted through said sleeves and pressure-fitted in said pin holes.

9. The Cardan-type universal joint according to claim 2, wherein:
said hub and said yokes of each of said joint bodies are formed together into a single member,
said bearing means has a bearing hole disposed radially at and through the front end portion of each of said yokes, said bearing hole having a bearing-metal sleeve pressure-fitted therein, and
said cross-shaped member further comprises a center piece having four circumferentially equally spaced pin holes formed radially therein, said center piece having said pins respectively inserted through said sleeves and pressure-fitted in said pin holes.

10. The Cardan-type universal joint according to claim 2, wherein:
said hub and said yokes of each of said joint bodies are formed together into a single member,
said bearing means has a bearing hole disposed radially at and through the front end portion of each of said yokes, said bearing hole having a bearing-metal sleeve pressure-fitted therein, and
said cross-shaped member further comprises a center piece having four circumferentially equally spaced pin holes formed radially therein, said center piece having said pins respectively inserted through said sleeves and pressure-fitted in said pin holes.

* * * * *